April 4, 1967 G. A. BURNS ETAL 3,312,107
LIQUID STORAGE AND MEASURING SYSTEM
Filed Sept. 25, 1964
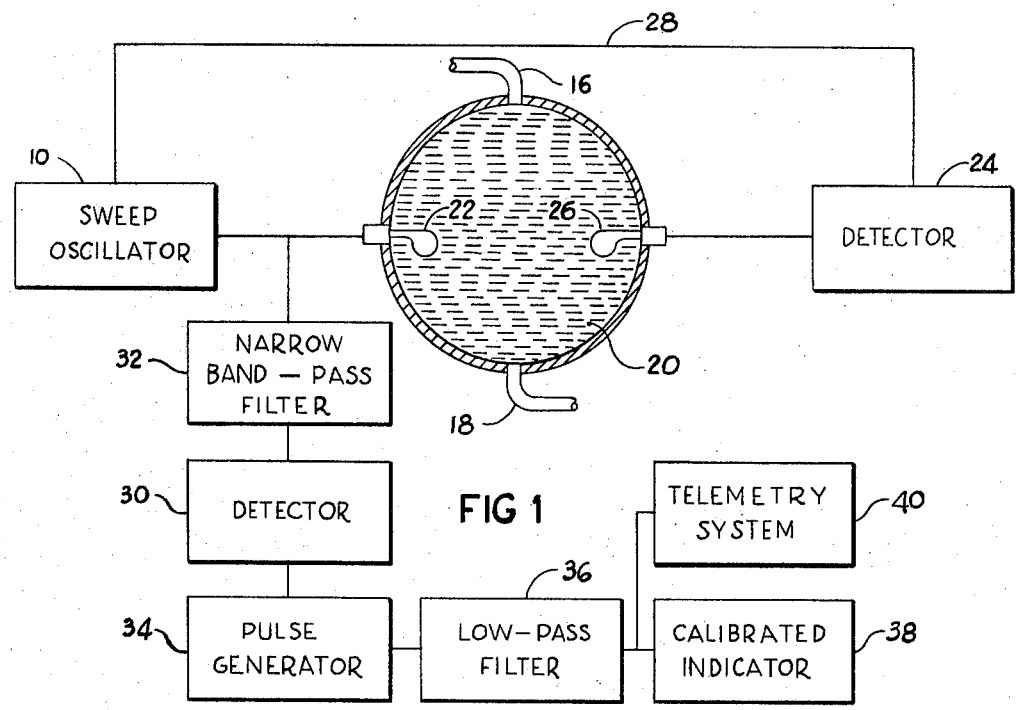
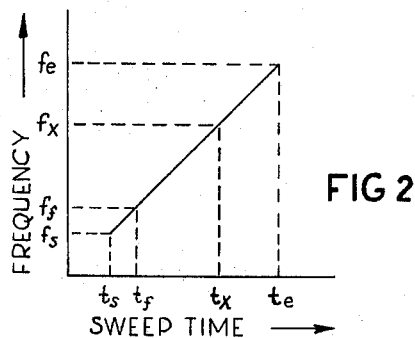
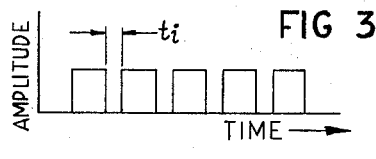
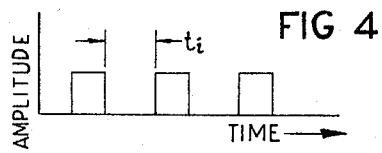
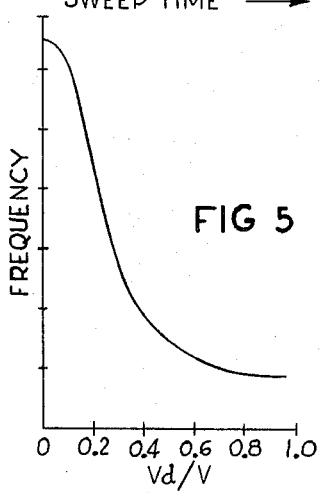
GENE A. BURNS
CALVIN J. MEIERBACHTOL
INVENTORS
BY Carl R. Brown
ATTORNEY
Alfonso ......
AGENT

United States Patent Office 3,312,107
Patented Apr. 4, 1967

3,312,107
LIQUID STORAGE AND MEASURING SYSTEM
Gene A. Burns, La Mesa, and Calvin J. Meierbachtol, El Cajon, Calif., assignors to General Dynamics Corporation, San Diego, Calif., a corporation of Delaware
Filed Sept. 25, 1964, Ser. No. 399,245
8 Claims. (Cl. 73—290)

This invention relates to apparatus for measuring the quantity of liquid in a storage tank and more particularly to apparatus for measuring the quantity of liquid under the environmental conditions of space flight utilizing radio frequency energy techniques.

The problems and inaccuracies inherent in the measurement of propellant quantities under the environmental conditions of space flight are formidable. During a normal mission both conditions of high acceleration and prolonged coast periods are encountered during which propellant monitoring is made difficult by propellant dispersion within the storage tanks. The ability to measure the quantity of propellant accurately and continuously is necessary to ensure fulfillment of the mission, or if need be, to abort the mission prior to the reaching of a point of failure or no-return.

Heretofore known measuring devices have not proven entirely satisfactory. For example, capacitance type liquid measuring devices are known but do not perform satisfactorily under zero-gravity conditions. Furthermore, other types of liquid measuring devices now in use do not possess the ability to accurately and continuously measure the quantity of liquid.

In the practice of this invention use is made of certain known electromagnetic resonance phenomenon. According to this phenomenon, the resonant frequency of a cavity having a volume of arbitrary form, completely enclosed by metallic surfaces, and containing a dielectric material, changes as function of the amount of dielectric present in the cavity. A given cavity theoretically has an infinite number of resonant modes, each mode corresponding to a definite resonant frequency. By exciting the cavity with electromagnetic energy at a frequency differing from any of the resonant frequencies of the cavity the electromagnetic field intensity in the cavity will be extremely small. As the frequency of the exciting source approaches one of the resonant frequencies of the cavity, pronounced electromagnetic oscillations occur as evidenced by a large value of electromagnetic field intensity. The maximum amplitude of the electromagnetic field intensity occurs when the frequency of the exciting source equals one of the resonant frequencies of the cavity. As the cavity is continuously loaded with a liquid dielectric the resonant frequency of the cavity will decrease depending upon the amount of liquid in the cavity and the dielectric properties of the liquid. This sharp change in resonant frequency is used to indicate the quantity of liquid in the cavity with excellent accuracy.

Briefly, in accordance with this invention, a sweep frequency oscillator is used to produce swept frequency signals to excite a metallic storage tank containing the liquid to be measured which behaves as a resonant transmission type of cavity. The sweep oscillator generates frequencies from below the resonant frequency of the tank when full of liquid to the resonant frequency of the tank when empty of the liquid. When the sweep frequency signal equals one of the resonant frequencies of the tank the signal is transmitted through the tank where it is detected at the output. This detected signal is fed back to the sweep oscillator where it is used to stop the sweep oscillator and return the sweep cycle to its start frequency. This cycle is repeated and a different resonant frequency is detected depending upon the amount of liquid then contained within the tank. A portion of the lowest output frequency or start frequency of the sweep oscillator is coupled into a narrow band-pass filter which is tuned to pass only this particular frequency. This signal is detected and used to trigger a pulse generator circuit. The corresponding output pulse produced by the pulse generator circuit is characterized by having a constant amplitude and pulse width. The pulse is then passed to a low-pass filter to determine the level of the direct current component present in the pulse. As the sweep cycle of the sweep oscillator is increased due to a decrease in the quantity of liquid within the tank, the number of pulses per unit sweep cycle generated by the pulse generator circuit is decreased. Thus the direct current level at the output of the low-pass filter is decreased thereby indicating a decrease in the quantity of liquid. This direct current output signal may then be applied to a meter or a similar indicating device to obtain a direct measure of the quantity of liquid, or the signal may be fed to some other utilization device where advantageous use can be made of the signal information representative of the quantity of liquid in the tank.

It is therefore an object of this invention to provide a liquid measuring device characterized by simplicity of construction, low weight, and by having a minimum number of parts immersed in the liquid to be measured.

Another object of this invention is to provide apparatus for accurately measuring a quantity of liquid.

A further object of this invention is to provide apparatus capable of measuring a quantity of liquid in a tank under zero-gravity conditions.

Another object of this invention is to provide measuring apparatus which accurately continuously measures the liquid contents of a tank under the environmental condition of space flight by the use of radio frequency energy.

Further objects and advantages and a better understanding of this invention may be had by references to the following detailed description and to the drawings, in which:

FIGURE 1 is a partial block diagram and partial cross sectional view of the system employing the invention;

FIGURE 2 is a graph showing the relationship between the output frequency and the sweep line of the sweep oscillator of the present invention;

FIGURE 3 is a showing of the output pulses of the pulse generator when the tank is full of liquid to be measured;

FIGURE 4 is a showing of the output pulses from the pulse generator when there has been a decrease of the amount of liquid in the tank; and FIGURE 5 shows a typical response pattern of the tank showing the relationship of the fractional volume of the liquid versus resonant frequency.

Referring now to the drawings and particularly to FIGURE 1, there is shown the apparatus of the present invention as including a sweep frequency oscillator 10 which provides a swept frequency over a desired band of frequencies. The oscillator 10 should be capable of being stopped in its sweep cycle and returned to its start frequency by the application of a trigger pulse. Also it should be capable of providing a frequency output which is a linear function of the sweep time.

The swept frequency signal derived from the sweep oscillator 10 is coupled through a coaxial transmission line 12 to a tank 14, the resonant frequency of which is to be determined. The tank is metallic and is provided with means in the form of attached tubes 16 and 18 for filling and draining the tank of a liquid 20, respectively.

Coupling between the transmission line and the tank is provided by means of a small coupling loop 22 inserted through the wall of the tank 14 for exciting an electromagnetic field within the tank.

A first detector 24, such as crystal, is coupled to the tank 14 by means of another small coupling loop 26. The coupling loop 26 as well as the coupling loop 22 should preferably have a much greater band width response than the tank 14.

The output from the detector 24 is fed back to the sweep oscillator 10 through a transmission line 28 to effect the heretofore mentioned stopping of the sweep cycle of the sweep oscillator and the returning of it to its start frequency.

A second detector 30, such as a crystal, is utilized to detect a portion of the signal produced by the sweep oscillator 10 in the coaxial transmission line 12 through a narrow band-pass filter network 32. A band-pass filter network 32 is conventional and allows only passage of the start frequency generated by the sweep oscillator 10, as will hereinafter be more fully described. The detector 30, along with the detector 24 should have square-law response characteristics.

The output signal from the detector 30 is routed to trigger a pulse generator 34, such as for example, a conventional monostable multivibrator. The output of the pulse generator 34 consists of pulses of constant amplitude and width. The constant amplitude pulses generated by the pulse generator 34 are fed to a conventional low-pass filter 36 which passes the direct current component of the input pulses. The resulting direct current signal, which is a measure of the resonant frequency of the tank 14, and consequently a measure of the liquid content of the tank, is applied to a calibrated indicator 38, such as a D.C. meter, and, if desired, to a telemetry system 40.

The operation of the device of the invention can be further understood by reference to FIGURES 2, 3, 4 and 5. The graph of FIGURE 2 represents the relationship between the output frequency and the sweep time of the sweep oscillator 10. The frequency $f_f$ occurring at a sweep time of $t_f$ represents the condition of the tank 14 when it is fully filled with liquid 20. Similarly, the frequency $f_e$ occurring at a sweep time of $t_e$ represents the condition of the tank when it is completely empty of liquid 20. One complete sweep cycle is, therefore, represented by the sweep time $(t_e-t_s)$. With an undetermined quantity of liquid 20 in the tank, the sweep oscillator 10 will sweep from the star frequency $f_s$ to a resonant frequency $f_x$ of the tank in a time interval $(t_x-t_s)$. It is this detected frequency $f_x$ which is fed back to the sweep oscillator 10 to trigger the sweep recycle procedure.

FIGURE 3 shows the graph of the output of the pulse generator circuit 34 when the tank 14 is nearly full of the liquid 20. The time interval between these pulses $t_1$ is short because the sweep time of the sweep oscillator 10 from $t_s$ to $t_x$ and back to $t_s$ is short. As the quantity of liquid in tank decreases the sweep time from $t_s$ to $t_x$ and back to $t_s$ increases, resulting in an increase in the time interval $t_1$ between pulses generated by the pulse generator circuit 34. This condition is shown in FIGURE 4.

FIGURE 5 shows a typical response pattern of a tank to be measured. This graph shows the variation of the quantity of liquid versus resonant frequency where $V_x$ is the total volume of the tank and $V_d$ is the volume occupied by the liquid. Therefore, $V_d/V$ represents the fractional volume of the liquid in tank. For an empty tank $V_d/V$ equals zero and for a fully loaded tank $V_d/V$ equals unity. The overall sensitivity is sufficiently large to measure all percentages of liquid loading. Greatest sensitivity of measurement is obtained when the Q value of the tank is relatively high.

Although a specific embodiment of the present invention has been described and illustrated in detail, it is to be understood that the invention is not limited thereto as many variations will be readily apparent to those skilled in the art and the invention is to be given its broadest possible interpretation within the terms of the appended claims.

What we claim is:

1. Apparatus for measuring the quantity of liquid in a tank having a band of resonant frequencies including a lower resonant frequency when full of the liquid, and a higher resonant frequency when empty of the liquid comprising generator means responsive to input trigger signals for cyclically generating output signals that regularly change over a predetermined range of frequencies in the tank, said output signals including signals within the band of resonant frequencies, and a start frequency signal outside the band, means connected to said generator means and responsive to a resonant frequency signal within the band for producing the input trigger signals to effect cyclic generation of said output signals by said generator means, and means connected to said generator means and responsive to said start frequency signal in said output signals for generating a signal indicative of the quantity of liquid in the tank.

2. Apparatus for measuring the quantity of liquid in a tank having a band of resonant frequencies including a lower resonant frequency when full of the liquid and a higher resonant frequency when empty of the liquid comprising generator means responsive to input trigger signals for cyclically generating output signals that regularly change over a predetermined range of frequencies in the tank, said output signals including signals within the band of resonant frequencies, and a start frequency signal below the band, means connected to said generator means and responsive to a resonant frequency signal within the band for producing the input trigger signals to effect cyclic generation of said output signals by said generator means, and means connected to said generator means and responsive to said start frequency signal in said output signals for generating a signal indicative of the quantity of liquid in the tank.

3. Apparatus for measuring the quantity of liquid in a tank having a band of resonant frequencies including a lower resonant frequency when full of the liquid and a higher resonant frequency when empty of the liquid comprising sweep oscillator means responsive to input trigger signals for cyclically producing output signals that regularly change over a predetermined range of frequencies, said output signals including signals within the band of resonant frequencies, and a start frequency signal outside the band, means connected to said sweep oscillator means and the tank for introducing said generated output signals into the tank, means connected to said sweep oscillator means and responsive to a resonant frequency signal within the band for producing the input trigger signals to effect cyclic generation of said output signals by said sweep oscillator means, and means connected to said sweep oscillator means responsive to said start frequency signal in said output signals for generating a signal indicative of the quantity of liquid in the tank.

4. Apparatus for measuring the quantity of liquid in a tank having a band of resonant frequencies including a lower resonant frequency when full of the liquid and a higher resonant frequency when empty of the liquid comprising sweep oscillator means responsive to input trigger signals for cyclically generating output signals that regularly change over a predetermined range of frequencies, said output signals including signals within the band of resonant frequencies, and a start frequency signal outside the band, a coupling loop positioned within the tank and connected to said sweep oscillator means for introducing said generated output signals into the tank, means connected to said sweep oscillator means and responsive to a resonant frequency signal within the band for producing the input trigger signals to effect cyclic generation of said output signals by said sweep oscillator means, and means connected to said sweep oscillator means and responsive to said start frequency signal in said output signals for generating a signal indicative of the quantity of liquid in the tank.

5. Apparatus for measuring the quantity of liquid in a tank having a band of resonant frequencies including a lower resonant frequency when full of the liquid and a higher resonant frequency when empty of the liquid comprising generator means responsive to input trigger signals for cyclically generating output signals that regularly change over a predetermined range of frequencies in the tank, said output signals including signals within the band of resonant frequencies, and a start frequency signal outside the band, a coupling loop within the tank for sensing a resonant frequency signal within the band, detector means connected to said coupling loop and said generator means for producing the input trigger signals in response to said sensed resonant frequency signal to effect cyclic generation of said output signals by said generator means, and means connected to said generator means and responsive to said start frequency signal in said output signals for generating a signal indicative of the quantity of liquid in the tank.

6. Apparatus for measuring the quantity of liquid in a tank having a band of resonant frequencies including a lower resonant frequency when full of the liquid and a higher resonant frequency when empty of the liquid comprising signal generator means responsive to input trigger signals for cyclically generating output signals that regularly change over a predetermined range of frequencies in the tank, said output signals including signals within the band of resonant frequencies, and a start frequency signal outside the band, means connected to said signal generator means and responsive to a resonant frequency signal within the band for producing the input trigger signals to effect cyclic generation of said output signals by said signal generator means, pulse generator means responsive to input trigger pulses for generating output pulses, means connected to said signal generator means and responsive to said start frequency signal for producing said input trigger pulses to said pulse generator means to effect generation of said output pulses, and means connected to said pulse generator means and responsive to said output pulses for producing a D.C. component signal of said output pulses indicative of the quantity of liquid in the tank.

7. Apparatus for measuring the quantity of liquid in a tank having a band of resonant frequencies including a lower resonant frequency when full of the liquid and a higher resonant frequency when empty of the liquid comprising signal generator means responsive to input trigger signals for generating output signals that regularly change over a predetermined range of frequencies in the tank, said output signals including signals within the band of resonant frequencies, and a start frequency signal outside the band, means connected to said signal generator means and responsive to a resonant frequency signal within the band for producing the input trigger signals to effect cyclic generation of said output signals by said signal generator means, pulse generator means responsive to input trigger pulses for generating output pulses, filter means connected to said signal generator means and responsive to said output signals only to pass said start frequency signal, detector means connected to said filter means and responsive to said passed start frequency signal for producing the input trigger pulses to effect generation of said output pulses by said pulse generator means, and means connected to said pulse generator means and responsive to said output pulses for producing a D.C. component signal of said output pulses indicative of the quantity of liquid in the tank.

8. Apparatus for measuring the quantity of liquid in a tank having a band of resonant frequencies including a lower resonant frequency when full of the liquid and a higher resonant frequency when empty of the liquid comprising sweep oscillator means responsive to input trigger signals for cyclically generating output signals that regularly change over a predetermined range of frequencies, said output signals including signals within the band of resonant frequencies, and a start frequency signal below the band, a first coupling loop positioned within the tank and connected to said sweep oscillator means for introducing said output signals into the tank, a second coupling loop positioned within the tank for sensing a resonant frequency signal within the band, detector means connected to said second coupling loop and said sweep oscillator means for producing the input trigger signals in response to said sensed resonant frequency signal to effect cyclic generation of said output signals by said sweep oscillator means, pulse generator means responsive to input trigger pulses for generating output pulses, filter means connected to said sweep oscillator means and responsive to said output signals only to pass said start frequency signal, detector means connected to said filter means and responsive to said passed start frequency signal for producing the input trigger pulses to effect generation of said output pulses by said pulse generator means, and filter means connected to said pulse generator means and responsive to said output pulses for producing a D.C. component signal of said output pulses for display as indicative of the quantity of liquid in the tank.

References Cited by the Examiner

UNITED STATES PATENTS 2,491,418 12/1949 Schlesman _____ 73—290 X
3,110,890 11/1963 Westcott et al. _____ 340—244

LOUIS R. PRINCE, *Primary Examiner.*

F. SHOON, *Assistant Examiner.*